US009202155B2

(12) United States Patent
Ritelli

(10) Patent No.: US 9,202,155 B2
(45) Date of Patent: Dec. 1, 2015

(54) BIDIRECTIONAL GRAPHIC MATRIX CODE

(76) Inventor: Walter Ritelli, Crespellano (IT)

( * ) Notice: Subject to any disclaimer, the term of this patent is extended or adjusted under 35 U.S.C. 154(b) by 253 days.

(21) Appl. No.: 13/976,739

(22) PCT Filed: Jan. 18, 2012

(86) PCT No.: PCT/IB2012/050247
§ 371 (c)(1),
(2), (4) Date: Jun. 27, 2013

(87) PCT Pub. No.: WO2012/098508
PCT Pub. Date: Jul. 26, 2012

(65) Prior Publication Data
US 2013/0277436 A1  Oct. 24, 2013

(30) Foreign Application Priority Data
Jan. 20, 2011  (IT) .............................. BO2011A0016

(51) Int. Cl.
*G06K 7/10*  (2006.01)
*G06K 19/06*  (2006.01)
*G06K 7/14*  (2006.01)

(52) U.S. Cl.
CPC ........ *G06K 19/06037* (2013.01); *G06K 7/1417* (2013.01)

(58) Field of Classification Search
CPC .......... G06K 7/1417; G06K 19/06028; G06K 19/06037; G06K 2019/06262
USPC ................. 235/462.01–462.49, 494
See application file for complete search history.

(56) References Cited

U.S. PATENT DOCUMENTS

2006/0261175 A1* 11/2006 Angelucci et al. ............ 235/494
2007/0108302 A1*  5/2007 Pintsov et al. ................ 235/494
2009/0242650 A1* 10/2009 Ushijima et al. .............. 235/494

FOREIGN PATENT DOCUMENTS

EP  0836149 A2  4/1998
EP  1720118 A2  11/2006

OTHER PUBLICATIONS

International Search Report for PCT/IB2012/000016, mailed Mar. 22, 2012, 3 pgs.

* cited by examiner

*Primary Examiner* — Laura Gudorf
(74) *Attorney, Agent, or Firm* — R. Neil Sudol; Henry D. Coleman

(57) ABSTRACT

A bidimensional graphic matrix code 1 has a plurality of words orientated along a first direction (D1), each word (2) formed from characters (3) arranged along a line which is parallel to the first direction (D1). Each character is formed from a first dot matrix, each dot (5) having a determined level of luminosity. Delimiting elements delimit each word, the delimiting elements orientated along a second direction (D2) which is perpendicular to the first direction (D1). Each delimiting element is formed by a line of dots arranged parallel to the second direction (D2). Each delimiting element is identifiable as groups arranged in a line, each group (8) comprising dots (5) having predetermined levels of luminosity, the delimiting elements interposed between adjacent words, such that identification of a delimiting element (6) enables identification of an initial or a final part of a word (2) adjacent to the delimiting element.

3 Claims, 2 Drawing Sheets

BIDIRECTIONAL GRAPHIC MATRIX CODE

FIELD OF THE INVENTION

The invention relates to a graphic code, in particular a bidimensional graphic matrix code.

DESCRIPTION OF THE PRIOR ART

One-dimensional graphic codes and bidimensional graphic codes are both known, incorporating data and usually printed on a support, for example on a product or on a label to be applied to a product.

In one-dimensional graphic codes, known also as "bar codes", the data is codified by means of a succession of bars of a given thickness and a predetermined reciprocal distance, positioned along a determined direction.

A drawback of bar codes consists in the small quantity of data codifiable thereon, namely only a few tens of alphanumeric characters.

Bidimensional graphic codes obviate this drawback as they have graphic areas in which the data is codified by means of a plurality of graphic symbols positioned along a first direction, like bar codes, and a second direction, perpendicular to the first direction.

Among bidimensional graphic codes the matrix type is known, where rectangular graphic areas are comprised, in which the data is codified by means of a plurality of dots of different luminosity, for example dots having low luminosity, definable as black dots, and high luminosity dots, definable as white points. In terms of a binary code, a black dot codifies, for example, a "logic zero" and a white point a "logic one".

From the theoretical point of view, a dot matrix having an area of a square inch, at a resolution of 300 DPI (dots per inch) can codify up to 90000 bits, i.e. 11250 bytes.

From the practical point of view, with a resolution such as the above-indicated one and with devices in common use (inkjet and laser printers) there would be distortions during printing of the code on a support; even optical scanners of a standard type would introduce further distortions during the optical acquisition step of the code. As a consequence, the decoding of the code would be affected by an intolerable number of errors.

Document EP 1.720.118 discloses a bidimensional graphic matrix code designed to be less sensitive to the above-mentioned distortion phenomenon, which can be printed and acquired optically by widely-used instruments.

This bidimensional graphic code comprises a plurality of dot matrices; each dot matrix is made up by a useful sub-matrix containing dots that codify a datum, and by a separation region formed by dots, in particular high-luminosity dots (white dots), which surrounds the useful sub-matrix on two adjacent sides. As a consequence, each useful sub-matrix is separated on each side by a separation region, which maximizes the distinguishability of the useful sub-matrices, which as mentioned incorporate a data content on the act of decoding.

The introduction of the separation regions, however, significantly limits the maximum number of codifiable bits per square inch.

SUMMARY OF THE INVENTION

The aim of the present invention thus consists in providing a bidimensional graphic matrix code which obviates this drawback.

This aim is attained with a bidimensional matrix code comprising: a plurality of words orientated along a first direction, each word in turn comprising a plurality of characters arranged one after another on a line which is parallel to the first direction, each character comprising a first dot matrix, each dot having a determined level of luminosity; the code further comprising: a plurality of delimiting elements for delimiting the words, which delimiting elements are orientated along a second direction which is perpendicular to the first direction; each delimiting element comprising at least a line of dots which is parallel to the second direction; each delimiting element being identifiable in that a plurality of groups are recognizable therein, arranged in a line one after another, each group comprising dots having predetermined levels of luminosity; each delimiting element being interposed between words arranged adjacent along the first direction, such that identification of a delimiting element enables identification of an initial or a final part of a word adjacent to the delimiting element; each group of a delimiting element being adjacent to a character of a respective word, such that identification of a group of a delimiting element enables identification of a position of a word adjacent to the group along the second direction.

The delimiting elements can be designed such as to be easily identifiable during decoding: for example they can comprise identical groups defined among themselves by dots having different luminosities, or can comprise groups each having dots of equal luminosity, which groups alternate between a high level of luminosity and a low level of luminosity (for example: a group comprises only high-luminosity points, while the group which precedes comprises only low-luminosity dots). Advantageously the identification of a delimiter element enables identifying the initial or final part of the adjacent words thereto, while the identification of each group forming the delimiter element enables identifying the position of a word adjacent to the group along the second direction. Thus it is possible to detect, with a very low margin of error, the initial part and the final part of each word along the first direction, as well as the position of the word along the second direction, notwithstanding the distortions which are verified on printing of the code of a support and on acquiring by optical means.

BRIEF DESCRIPTION OF THE DRAWINGS

Specific embodiments of the invention, and advantageous technical-functional characteristics correlated to the embodiments, will be described in the following of the present description, according to what is set out in the claims and with the aid of the accompanying figures of the drawings, in which:

DESCRIPTION OF PREFERRED EMBODIMENTS

Figure 1:
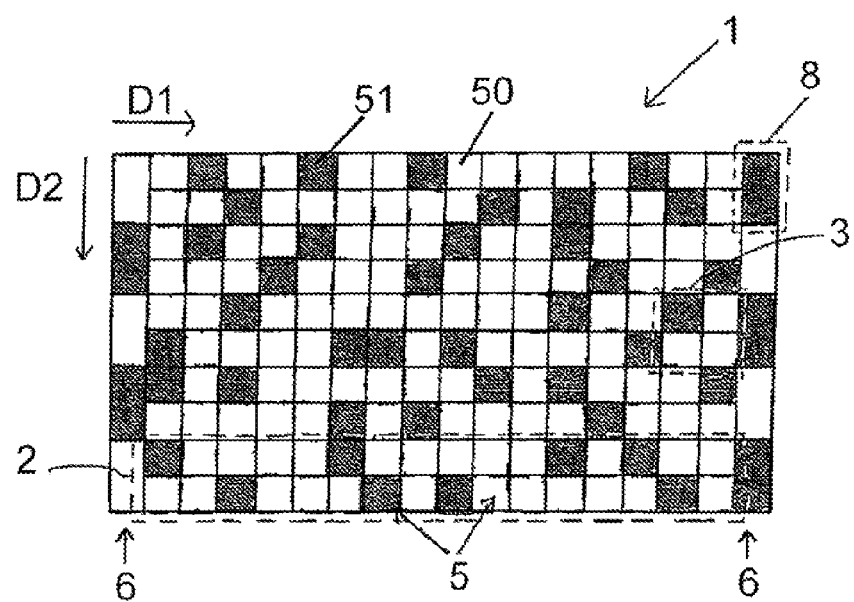
FIG. 1 is a partial view of the bidimensional graphic matrix code of the invention, according to a first embodiment thereof.

With reference to the accompanying figure, 1 denotes the bidimensional graphic matrix code of the present invention.

The bidimensional graphic matrix code 1 comprises: a plurality of words 2 orientated along a first direction D1, each word 2 comprising in turn a plurality of characters 3 arranged one after another along a line which is parallel to the first direction D1, each character 3 comprising a first dot 5 matrix, each dot 5 having a determined level of luminosity; a plurality of delimiting elements 6 for delimiting the words 2, which delimiting elements 6 are orientated along a second direction D2 which is perpendicular to the first direction D1; each delimiting element 6 comprising at least a line of dots 5 which is parallel to the second direction D2; each delimiting element 6 being identifiable in that a plurality of groups 8 are recognizable therein, arranged in a line one after another, each group 8 comprising dots 5 having predetermined levels of luminosity; each delimiting element 6 being interposed between words 2 arranged adjacent along the first direction D1, such that identification of a delimiting element 6 enables identification of an initial or a final part of a word 2 adjacent to the delimiting element 6; each group 8 of a delimiting element 6 being adjacent to a character 3 of a respective word 2, such that identification of a group 8 of a delimiting element 6 enables identification of a position of a word 2 adjacent to the group 8 along the second direction D2.

Each character 3 codifies a datum.

Each character 3 is formed by a first dot matrix 5 having lines of dots 5 which develop along the first direction D1 and columns of dots 5 which develop along the second direction D2.

Each group 8 is formed by a second dot matrix 5 having lines of dots 5 which develop along the first direction D1 and columns of dots 5 which develop along the second direction D2.

The number of dots 5 of the columns of each group 8 equals the number of dots 5 of the columns of each character 3; further, each group 8 is aligned along the second direction D2 with the words 2 adjacent thereto. In other words, the thickness of a group 8, identifiable from the number of dots 5 forming each column, is equal to the thickness of a word 2, identifiable by the number of dots 5 which form the columns of each character 3 of the word 2.

In this way, the identification of the position of a group 8 enables identification of the position of the words 2 adjacent thereto along the second direction D2.

In the accompanying figures, in particular, the first direction D1 is horizontal, while the second direction D2 is vertical.

The support on which the code can be printed is for example a paper sheet, a product or a label to be applied on a product.

With reference to FIG. 1, each word 2 is composed by eight characters 3, and each character 3 is formed by a dot matrix 5 of the type 2×2; each delimiter element 6 is constituted by a single line of dots 5; each group 8 is defined by a dot matrix 5 of the 2×1 type and is formed by dots 5 having equal luminosity, i.e. high luminosity, described as white dots 50, or low-luminosity, described as black dots 51. Therefore, a group 8 of dots 5 coloured white (high luminosity) is followed, and preceded, by a group 8 of dots 5 coloured black (low luminosity), and vice versa.

Each delimiter element 6 is therefore identifiable by an alternation of groups 8 having different luminosity.

In general, the different level of luminosity between consecutive groups can also be less marked (e.g. groups of a grey colour alternating with groups of a white colour, or in any case lighter or darker).

Figure 2:
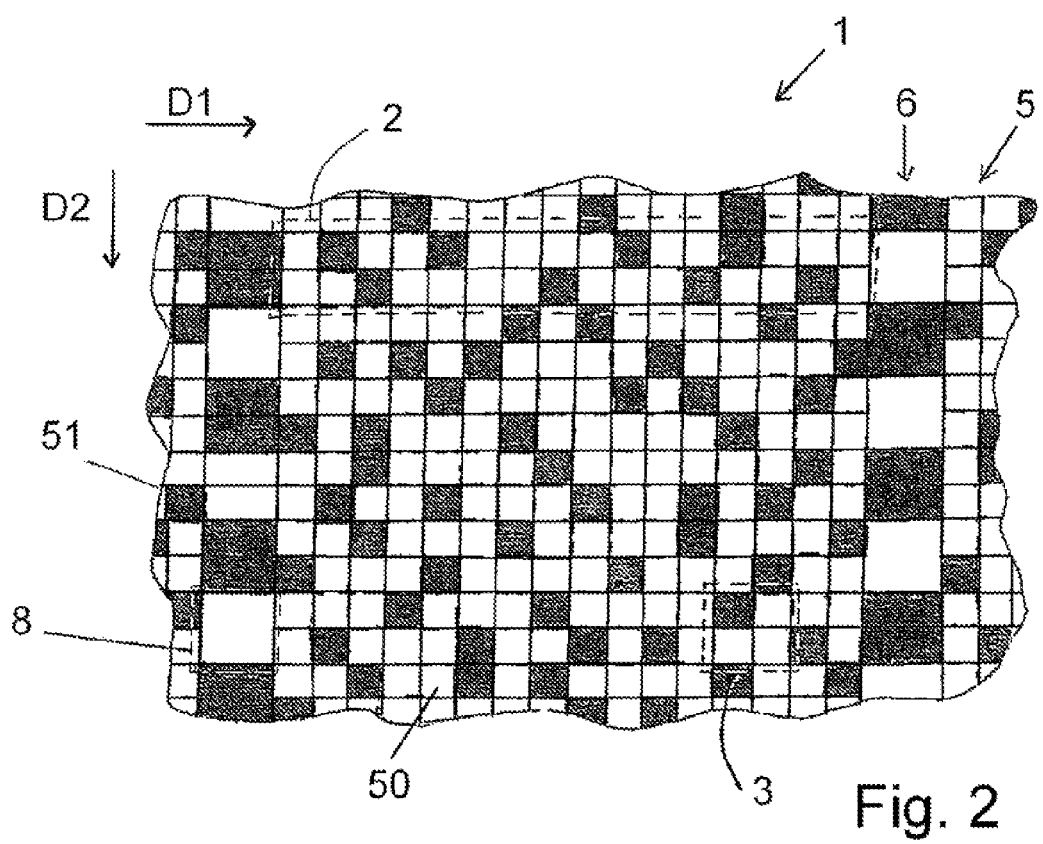
FIG. 2 is a partial view of the bidimensional graphic matrix code which is the object of the invention, according to a second embodiment.

The embodiment illustrated in FIG. 2 is distinguished by the embodiment illustrated in FIG. 1 only in that each delimiter element 6 is constituted by two lines of dots 5 instead of one; the dot matrix 5 of each group 8 is therefore of the 2×2 type. This gives an easier recognition of each delimiter element 6 by the decoding program.

Figure 3:
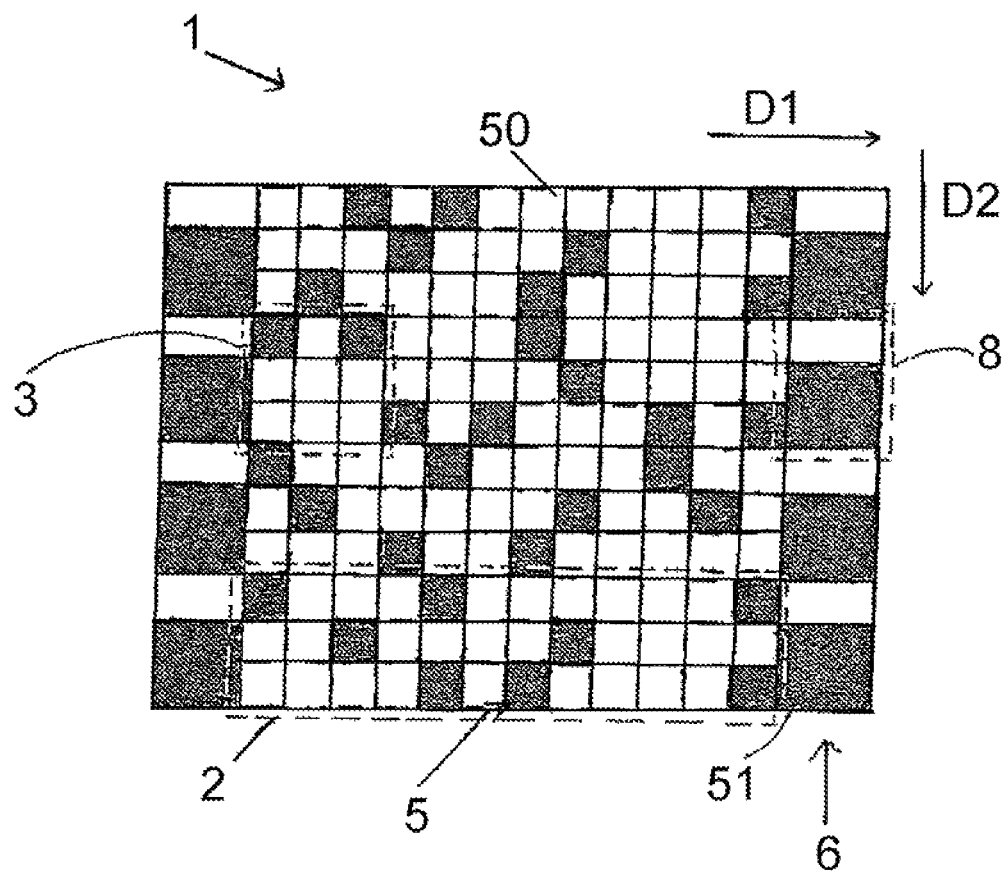
FIG. 3 is a partial view of the bidimensional graphic matrix code of the invention, according to a third embodiment thereof.

With reference to FIG. 3, each word 2 is made up of four characters 3, and each character 3 is formed by a dot matrix 5 of the 3×3 type; each delimiter element 6 is constituted by two lines of points 5; each group 8 is defined by a dot matrix 5 of the 3×2 type and is formed by dots 5 having different luminosity, such that adjacent groups 8 are easily recognizable.

Note that in particular, for the decoding operations, excellent solutions are those which include words comprising a number of characters going from one to eight (corresponding to a code of from 2 to 16 bits for each word).

The bidimensional graphic matrix code provided by the present invention is advantageous not only with respect to the bidimensional codes that are most widely used, in which each character enables codifying at most a single bit, but also with respect to the code disclosed in document EP 1 720 118, which can be considered the closest prior art to the present invention.

The graphic code described in the last-mentioned above document, already cited in the first part of the present document, is such that each character codifies a datum of greater dimensions than a single bit, as it exploits various configurations obtainable by combining, according to different modalities, a plurality of adjacent dots having low luminosity (i.e. black dots) internally of a useful sub-matrix (generally of the 3×3 type).

As already mentioned herein above, in order to decode the single characters and identify the relative alignment thereof, document EP 1 720 118 introduces a separation region, i.e. a region formed by high-luminosity dots (white dots) which surround each useful sub-matrix along two adjacent sides. The presence of the separation regions clearly considerably reduces the density of codifiable data in a same given occupied space (i.e. the bits per square inch).

In the cited document, it is further disclosed that each useful sub-matrix must comprise at least two low-luminosity dots preferably adjacent to one another: two adjacent low-luminosity dots, printed on a support using conventional techniques, give rise to a "mark" (i.e. a graphic sign) having larger dimensions than the sum of the single "marks" of dots considered singly (i.e. they product the effect known as the correlation effect), facilitating the process of acquisition and decoding the data.

However, in this way there are more configurations exhibiting a low-luminosity dot in common (see for example FIGS. 4*a* and 4*b* of document EP 1 720 118), and this can in any way create interference during the decoding stage.

The bidimensional graphic matrix code disclosed by the present invention primarily comprises elimination of the separation region present in document EP 1 720 118, facilitating a greater density of coded data given a same occupied space.

Further, the disclosed code guarantees absence of interference during the stage of decoding, without necessarily comprising a plurality of low-luminosity dots adjacent to one another.

For example, with reference to FIGS. 1 and 2, each character is formed by matrices of the 2×2 type in which a single low-luminosity dot can be included, which can be in four different configurations (one for each dot of the 2×2 matrix): in this way, each configuration is clearly distinct from the others. By superposing the configurations, there is no interference between them, as will instead occur in the code disclosed by EP 1 720 118.

The foregoing has been described by way of non-limiting example, and any constructional variants are understood to fall within the ambit of protection of the present technical solution, as described above and claimed in the following.

The invention claimed is:

1. A bidimensional graphic matrix code (1), comprising:
    a plurality of words (2) orientated along a first direction (D1), each word (2) comprising in turn a plurality of characters (3) arranged one after another along a line which is parallel to the first direction (D1), each character (3) comprising a first dot matrix having lines of dots (5) that develop along the first direction (D1) and columns of dots (5) that develop along the second direction (D2), each dot (5) having a determined level of luminosity;
    a plurality of delimiting elements (6) for delimiting each word (2), which delimiting elements (6) are orientated along a second direction (D2) which is perpendicular to the first direction (D1);
    each delimiting element (6) comprising at least a line of dots (5) which is parallel to the second direction (D2);
    each delimiting element (6) being identifiable in that a plurality of groups (8) are recognizable therein, arranged in a line one after another, each group (8) comprising dots (5) having predetermined levels of luminosity;
    each delimiting element (6) is interposed between adjacent words (2) arranged along the first direction (D1), such that identification of a delimiting element (6) enables identification of an initial or a final part of each word (2) adjacent to the delimiting element (6);
    each group (8) forming each delimiting element (6) is adjacent to a character (3) of a respective word (2) in such a way as to be in contact with the character (3), such that identification of a group (8) of a delimiting element (6) enables identification of a position of a word (2) adjacent to the group (8) along the second direction (D2);
    each group (8) is formed by a second dot matrix having one or more columns of dots (5) that develop along the second direction (D2), wherein the number of dots (5) of the one or more columns of each group (8) is equal to the number of dots (5) of the columns of each character (3), and wherein each group (8) is aligned along the second direction (D2) with a word (2) adjacent thereto;
    wherein the dots (5) of a same group (8) of each delimiting element (6) exhibit, within the group, a same level of luminosity and wherein the dots (5) of groups (8) adjacent to one another exhibit a different level of luminosity in that a group (8) of a delimiting element (6) adjacent to a first character (3) of a respective word (2) has a different level of luminosity with respect to a group (8) of a delimiting element (6) adjacent to a last character (3) of the same word (2); and
    each character is formed by matrices of a 2×2 type in which a single low-luminosity dot is included, in which different positions of the low-luminosity dot encode different characters.

2. The code (1) of claim 1, wherein the dots (5) of each group (8) selectively exhibit a luminosity selected from two predefined levels of luminosity.

3. The code (1) of claim 1, wherein each word (2) is defined by from one to eight characters (3).

* * * * *